(12) United States Patent
White et al.

(10) Patent No.: US 9,912,574 B1
(45) Date of Patent: Mar. 6, 2018

(54) METHODS AND APPARATUS RELATED TO A VIRTUAL MULTI-HOP NETWORK TOPOLOGY EMULATED WITHIN A DATA CENTER

(71) Applicant: Juniper Networks, Inc., Sunnyvale, CA (US)

(72) Inventors: Joseph White, San Jose, CA (US); Simon Gordon, San Jose, CA (US); Suresh Boddapati, Union City, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 362 days.

(21) Appl. No.: 14/533,731

(22) Filed: Nov. 5, 2014

Related U.S. Application Data

(63) Continuation of application No. 12/872,898, filed on Aug. 31, 2010, now Pat. No. 8,898,333.

(51) Int. Cl.
*H04L 12/28* (2006.01)
*H04L 12/751* (2013.01)
(Continued)

(52) U.S. Cl.
CPC .............. *H04L 45/02* (2013.01); *H04L 49/15* (2013.01); *H04L 49/70* (2013.01)

(58) Field of Classification Search
CPC ....... H04L 2012/5617; H04L 29/06306; H04L 29/08126; H04L 29/08846; H04L 45/68; H04L 65/1059; H04L 67/08; H04L 67/1034; G06F 9/455; G06F 15/173; G06F 1/0314; G06F 1/1698; G06F 1/3215

See application file for complete search history.

(56) References Cited

U.S. PATENT DOCUMENTS 6,252,878 B1 6/2001 Locklear et al.
6,976,103 B1 12/2005 Watanabe et al.
(Continued)

OTHER PUBLICATIONS

Muknahallipatna S., "Performance analysis of a fibre channel switch supporting node port identifier virtualization: Preliminary results", IEEE, published in: Local Computer Networks, 2009. LCN 2009. IEEE 34th Conference on Dec. 18, 2009.*
(Continued)

*Primary Examiner* — Ricky Ngo
*Assistant Examiner* — Lan Huong Truong
(74) *Attorney, Agent, or Firm* — Cooley LLP

(57) ABSTRACT

In one embodiment, an apparatus can include a switch fabric. The apparatus can also include a first edge device operatively coupled to an edge of the switch fabric and having a plurality of ports. The apparatus can also include a second edge device operatively coupled to the edge of the switch fabric and having a plurality of ports, the switch fabric defining a plurality of single-hop paths between the first edge device and the second edge device. The first edge device configured to send to a peripheral processing device operatively coupled to the first edge device a representation of a mapping of a portion of the plurality of ports of the first edge device and a portion of the plurality of ports of the second edge device to a plurality of ports included in a non-edge device represented within a virtual multi-hop network topology.

13 Claims, 4 Drawing Sheets

(51) Int. Cl.
*H04L 12/933* (2013.01)
*H04L 12/931* (2013.01)

(56) References Cited

U.S. PATENT DOCUMENTS

| | | | | |
|---|---|---|---|---|
| 7,088,710 | B1* | 8/2006 | Johnson | H04L 12/64 |
| | | | | 370/357 |
| 7,362,702 | B2 | 4/2008 | Terrell et al. | |
| 7,447,197 | B2 | 11/2008 | Terrell et al. | |
| 8,190,769 | B1 | 5/2012 | Shukla et al. | |
| 8,700,811 | B2* | 4/2014 | Oshins | G06F 9/45558 |
| | | | | 710/36 |
| 8,880,739 | B1* | 11/2014 | Brar | H04Q 3/0062 |
| | | | | 370/250 |
| 8,995,301 | B1* | 3/2015 | Miller | H04L 45/121 |
| | | | | 370/254 |
| 2001/0053149 | A1 | 12/2001 | Mo et al. | |
| 2003/0117966 | A1* | 6/2003 | Chen | H04L 45/02 |
| | | | | 370/255 |
| 2005/0047413 | A1* | 3/2005 | Ilnicki | H04L 12/2602 |
| | | | | 370/392 |
| 2005/0068968 | A1* | 3/2005 | Ovadia | H04L 45/04 |
| | | | | 370/396 |
| 2008/0138067 | A1* | 6/2008 | Beshai | H04L 49/357 |
| | | | | 398/45 |
| 2008/0159277 | A1 | 7/2008 | Vobbilisetty et al. | |
| 2010/0054260 | A1* | 3/2010 | Pandey | H04L 49/00 |
| | | | | 370/395.53 |
| 2010/0061391 | A1 | 3/2010 | Sindhu et al. | |
| 2010/0085981 | A1 | 4/2010 | Gupta et al. | |
| 2011/0299525 | A1 | 12/2011 | Peterson | |
| 2011/0302284 | A1* | 12/2011 | Heim | H04L 41/0816 |
| | | | | 709/222 |
| 2012/0230182 | A1 | 9/2012 | Southworth et al. | |

OTHER PUBLICATIONS

U.S. Appl. No. 12/844,350, filed Jul. 27, 2010 entitled "Methods and Apparatus Related to Port Numbering in a Distributed Virtual Switch". [Previously cited by or submitted to USPTO in U.S. Appl. No. 12/872,898, filed Aug. 31, 2010].

Office Action for U.S. Appl. No. 12/844,350, dated Dec. 6, 2011. [Previously cited by or submitted to USPTO in U.S. Appl. No. 12/872,898, filed Aug. 31, 2010].

Final Office Action for U.S. Appl. No. 12/844,350, dated Jun. 11, 2012. [Previously cited by or submitted to USPTO in U.S. Appl. No. 12/872,898, filed Aug. 31, 2010].

Advisory Action for U.S. Appl. No. 12/844,350, dated Aug. 22, 2012. [Previously cited by or submitted to USPTO in U.S. Appl. No. 12/872,898, filed Jun. 20, 2014].

Office Action for U.S. Appl. No. 12/844,350, dated Mar. 18, 2013. [Previously cited by or submitted to USPTO in U.S. Appl. No. 12/872,898, filed Jun. 20, 2014].

\* cited by examiner

US 9,912,574 B1

METHODS AND APPARATUS RELATED TO A VIRTUAL MULTI-HOP NETWORK TOPOLOGY EMULATED WITHIN A DATA CENTER

CROSS-REFERENCE TO RELATED PATENT APPLICATION

This patent application is a division of U.S. patent application Ser. No. 12/872,898, (now U.S. Pat. No. 8,898,333), entitled "METHODS AND APPARATUS RELATED TO A VIRTUAL MULTI-HOP NETWORK TOPOLOGY EMULATED WITHIN A DATA CENTER," filed Aug. 31, 2010; which is incorporated by reference in its entirety.

BACKGROUND

Some embodiments described herein relate generally to virtualized networking including, for example, the emulation of a virtual multi-hop network topology within a data center.

Maintaining and upgrading a legacy network system can be costly and technically challenging from a financial and computing efficiency perspective. Although technological advancements may render these legacy network systems obsolete, owners of these legacy network systems may be hesitant to migrate these legacy network systems to a new platform, such as a data center, because core functionality may be lost or altered in an undesirable fashion. Although legacy network systems can be physically migrated to a data center environment, a need exists for methods and apparatus for emulation of a legacy network system with a virtual multi-hop network topology within a data center. This can allow, for example, the core functionality of the legacy network system to be maintained in a desirable manner.

SUMMARY

In one embodiment, an apparatus can include a switch fabric. The apparatus can also include a first edge device operatively coupled to an edge of the switch fabric and having a set of ports. The apparatus can also include a second edge device operatively coupled to the edge of the switch fabric and having a set of ports. The switch fabric can define single-hop paths between the first edge device and the second edge device. The first edge device is configured to send to a peripheral processing device operatively coupled to the first edge device a representation of a mapping of a portion of the set of ports of the first edge device and a portion of the set of ports of the second edge device to a set of ports included in a non-edge device represented within a virtual multi-hop network topology.

DETAILED DESCRIPTION

Figure 1:
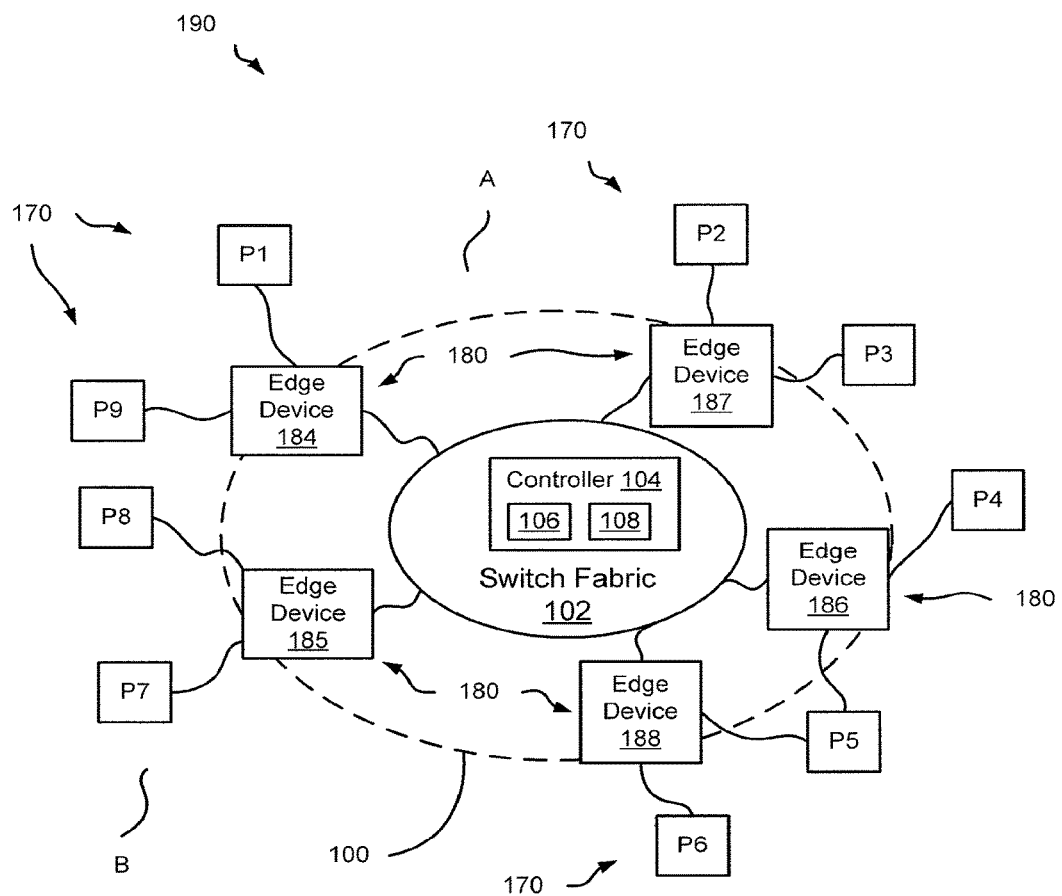
FIG. 1 is a schematic diagram that illustrates a switch core of a data center configured to emulate a virtual multi-hop network topology, according to an embodiment.

A switch core of a data center can be configured to emulate a multi-hop network topology of, for example, a legacy network system. The switch core of the data center can be a single-hop switch core—a switch core defining many mutually independent single logical hops or single-hop paths—between devices of the emulated multi-hop network topology. Specifically, the switch core (e.g., portions of the single-hop switch core) can be configured to manage routing (e.g., advertise routing information, define routing information) so that from the perspective of the devices communicating via the single-hop switch core of the data center, the devices are connected in a multi-hop network topology.

For example, a set of devices that were previously connected in a multi-hop network topology (or configured to function within a multi-hop network topology) can be connected via a single-hop switch core of a data center. The switch core (e.g., a controller of the single-hop switch core, a control plane of the single-hop switch core) can be configured to manage routing so that even though the devices, which are connected via the switch core (e.g., the single-hop switch core of the data center) and no longer connected in a multi-hop network topology, can continue to process packets (e.g., send packets, define packets, receive packets) as if the devices are still connected in a multi-hop network topology. In some embodiments, one or more components of the switch core (e.g., edge devices of the switch core of the data center) can be configured to emulate portions of the multi-hop network topology of the devices in a virtual fashion so that the operation of the single-hop switch core as a communication medium between the devices will be transparent to the devices. Said differently, the switch core of the data center can be configured to transparently emulate one or more portions of a legacy network topology defined by several devices. The devices within a legacy network topology emulated at a data center can be referred to as legacy devices. peripheral processing devices or legacy peripheral processing devices.

In some embodiments, emulation of a legacy network at a data center can be accomplished, at least in part, by sharing a first set of information (e.g., a first set of routing information) for use by the legacy devices connected to the switch core of the data center, and using a second set of information (e.g., a second set of routing information) different from the first set of information for use within the switch core of the data center. The first set of information shared with the legacy devices connected to the switch core can be referred to as external information (and the legacy devices can be referred to as being external to the data center) and the information used at the switch core can be referred to as internal information (and devices of the switch core can be referred to as being internal to the switch core of the data center).

For example, routing information (e.g., path information, port mapping information) representing a multi-hop network topology can be sent to (e.g., advertised to, broadcast to) legacy devices so that the legacy devices can send and receive data (e.g., data packets) based on the routing information. In such instances, the routing information can be referred to as external routing information. The switch core, however, can be configured to process the data within the switch core based on internal routing information. Accordingly, the data can be internally handled within the switch core based on internal routing information different from the external routing information. The switch core of the data center (e.g., edge devices of the switch core) can be configured to translate between the external routing information and the internal routing information so that communication between the legacy devices and the switch core of the data center can be properly handled even though internal processing within the switch core may be different than processing by devices from the legacy network system.

In some embodiments, the external and/or internal information can include, for example, security modes/features, network address assignments modes/features, protocol support information, scaling limits, default network information, and/or so forth. In some embodiments, the data processed by the data center (e.g., legacy device portion, switch core portion) can be packets. In some embodiments, the packets can be, for example, Ethernet packets. In some embodiments, the packets can be fiber channel over Ethernet (FCoE) packets (i.e., fiber channel packets encapsulated within Ethernet packets) associated with a storage area network (SAN). In yet embodiments, the packets can be fiber channel (FC) packets associated with a storage area network (SAN).

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" or "single-hop path" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first module and/or device and the second module and/or device. In some embodiments, for example, a second protocol can use the destination address of the first protocol to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

FIG. 1 is a schematic diagram that illustrates a switch core 100 of a data center 190 configured to emulate a virtual multi-hop network topology, according to an embodiment. The switch core 100 includes a switch fabric 102 and edge devices 184 through 188. The edge devices can be collectively referred to as edge devices 180. As shown in FIG. 1, peripheral processing devices P1 through P9 are connected to the edge devices 180 of the switch core 100. For example, peripheral processing devices P7 and P8 are connected to edge device 185, and peripheral processing devices P1 and P9 are connected to edge device 184. The peripheral processing devices P1 through P9 can collectively be referred to as peripheral processing devices 170. In some embodiments, some or all of the peripheral processing devices 170 can be legacy devices from a legacy network system migrated to the switch core 100.

In this embodiment, the edge devices 180 are configured to communicate with one another via the switch fabric 102, which is part of a single-hop switch core 100. Specifically, the switch fabric 102 is configured define a set of mutually independent single-hop paths or parallel single logical hops between the edge devices 180. In other words, portions of the switch fabric 102 can function as part of a single logical hop (e.g., a single large-scale consolidated FC/L2/L3 switch). In some embodiments, portions of the switch fabric 102 can be physically distributed across, for example, many chassis and/or modules interconnected by multiple physical hops. In some embodiments, for example, a processing stage of the switch fabric 102 can be included in a first chassis and another processing stage of the switch fabric 102 can be included in a second chassis. Both of the processing stages can logically function as part of a single consolidated switch (e.g., within the same logical hop according to a first protocol) but include a separate single physical hop between respective pairs of processing stages. Similarly stated, a physical hop can operatively couple each stage within the switch fabric 102 representing a single logical hop associated with a protocol used to route data outside the switch fabric 102.

Additionally, packet classification and forwarding associated with a protocol used to route data outside a single logical hop need not occur at each stage within the single logical hop. In some embodiments, for example, packet classification and forwarding associated with a first protocol (e.g., Ethernet or Fibre Channel) can occur prior to a module and/or device sending the data packet to another module and/or device via the single logical hop. As shown in FIG. 1, packet classification and/or forwarding of a data packet (based on a particular protocol) to one of the edge devices 180 via a single logical hop defined by the switch fabric 102 can be performed at another of the edge devices 180. Accordingly, the switch fabric 102 can be configured to function as part of a single-hop switch core 100. Additional details related to packet classification associated within a data center are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

As shown in FIG. 1, the switch core 100 is configured to function so that portions of the peripheral processing devices 170 can communicate with one another via the switch core 100. The switch core 100 can be configured so that peripheral processing devices P1 through P9 can communicate as if connected in multi-hop network topology even though the peripheral processing devices P1 through P9 are actually communicating via the switch core 100, which functionally operates as a single consolidated switch defined by many single logical hops. In other words, the peripheral processing devices P1 through P9, which are configured to communicate (e.g., send/receive data packets) with one another based on a multi-hop network topology, can continue to communicate as if connected in the multi-hop network topology even though they are actually connected via the switch core 100. In other words, the switch core 100 can be configured so that the peripheral processing devices 170 can function as if connected in a multi-hop topology that does not actually exist. In some embodiments, the peripheral processing devices P1 through P9 can be referred to by their identifiers. For example, peripheral processing device P1 can be referred to simply as P1.

For example, peripheral processing device P8 can be configured to function as if a packet that is sent from peripheral processing device P8 to peripheral processing device P1 traverses peripheral processing device P9. One or more of the edge devices 180 of the switch core 100 can be configured to advertise, for example, routes (e.g., advertise routes within a routing table) to peripheral processing device P8 as if P8 is connected to P1 through P9 even though P8 is not actually connected to P1 through P9. Specifically, edge device 185 can be configured to advertise routes to P8 based on a multi-hop network topology where P9 is disposed between P1 and P8, a single physical hop is between P1 and P9 and a different single physical hop is between P8 and P1. Accordingly, peripheral processing device P8 can be configured to send packets to P1 as if the packets will traverse P9. The edge device 185, however, can be configured to process the packets from P8 and forward the packets from P8 directly to P1. Thus, the packets will not traverse P9 (which is connected to edge device 184). Traversal of P9 is not necessary because all of the peripheral processing devices are directly connected to the switch core 100. Said differently, the forwarding of packets between P8 and P1 can be referred to as being collapsed because the forwarding path excludes P9.

In some embodiments, the routes advertised to the peripheral processing devices 170 can be referred to as external routes. In some embodiments, internal routes used within the data center to internally process packets, however, can be different than the external routes advertised to the peripheral processing devices 170. Accordingly, the multi-hop network topology can be represented to the peripheral processing devices 170 using the external routes while processing within the switch core 100 can be handled based on a different set of internal routes representing the topology within the switch core 100. In some embodiments, the internal routes can exclude single physical hops within a multi-hop path that would be represented within an external route sent to the peripheral processing devices 170. In some embodiments, data sent from peripheral processing devices 170 to the switch core 100 can be referred to as "incoming" or as "ingress" data while data sent from the switch core 100 to the peripheral processing devices 170 can be referred to as "outgoing" or as "egress" data.

In some embodiments, the multi-hop topology emulation functionality of the switch core 100 can be managed at a controller 104. In some embodiments, the controller 104 can be configured to process and/or distribute information (e.g., routing information) related to the multi-hop network topology so that emulation can be achieved. In some embodiments, the controller 104 can be configured to distribute information related to the multi-hop topology to the edge devices 180 so that the edge devices 180 can advertise information related to the multi-hop topology to the peripheral processing devices 170. Thus, the emulation can be implemented by the controller 104 via the edge devices 180 so that the actual topology of the switch core 100 can be transparent to (e.g., hidden from) the peripheral processing devices 170 and the peripheral processing devices 170 can operate based on a multi-hop network topology.

As shown in FIG. 1, the controller 104 has a memory 106 and a processor 108. The controller 104 can be configured to store information related to a topology of a multi-hop network in the memory 106. The multi-hop network topology can be a virtualized multi-hop network topology that includes identifiers related to, for example, the peripheral processing devices P1 through P9. In some embodiments, information related to or defining at least a portion of the multi-hop network topology can be stored as external information in the memory 106 of the controller 104. In some embodiments, information related to or defining at least a portion of the topology of the switch core of the data center can be stored as internal information in the memory 106 of the controller 104. In some embodiments, the external information can be mapped to the internal information, and these mapped relationships between the external information and the internal information can be stored in the memory 106 of the controller 104. In some embodiments, the internal information, the external information, and/or the relationships between the internal information and the external information can be defined by, for example, a network administrator. In some embodiments, the processor 108 can be configured to process information stored in the memory 106. In some embodiments, the processor 108 can be configured to perform functions related to emulation of the multi-hop topology.

In some embodiments, the controller 104 can be configured to translate between external information (which can be advertised to the peripheral processing devices 170) and internal information (used within the switch core 100). In some embodiments, the external information can be external routing tables and/or port identifiers representing a multi-hop network topology, and the internal information can be internal routing tables and/or port identifiers representing the topology of the switch core 100. In some embodiments, the memory 106 of the controller 104 can be configured to store a mapping between the internal information and the external information that can be used to translate (e.g., translate data, translate portions of data packets) between the internal information and the external information.

In some embodiments, the controller 104 can be configured to push at least a portion of the mapping (e.g., relationship) information (from the memory 106) to one or more of the edge devices 180 so that the edge devices 180 can handle incoming data (e.g., incoming data packets) based on the external information and forward the incoming data (after received) within the switch core 100 based on the internal information. In such embodiments, the edge devices 180 can be configured to modify the incoming data so that the data (after received) can be processed internally within the switch core 100 based on the internal information. Also, the edge devices 180 can be configured to receive outgoing data from other devices within the switch core 100 based on the internal information and can be configured to modify the outgoing data so that when the outgoing data is sent to the peripheral processing devices 170 from the switch core 100, the peripheral processing devices 170 can process the outgoing data based on the external information.

In some embodiments, external information can be sent to one or more of the peripheral processing devices 170 in response to a request from one or more of the peripheral processing devices 170. In some embodiments, the request can be sent to one or more of the edge devices 180 and the edge device(s) 180 can send the external information to the peripheral processing device(s) 170. In some embodiments, the request can be sent to one or more of the edge devices 180 and the edge device(s) 180 can be configured to request and receive the external information from the controller 104 so that the external information can then be forwarded to the peripheral processing device(s) 170. In some embodiments, internal information and/or information representing relationships between the internal information and external information can also be sent to one or more of the peripheral processing devices 170 in response to a request from the peripheral processing device(s) 170.

In some embodiments, external information can be sent to one or more of the peripheral processing devices 170 and/or to one or more of the edge devices 180 in response to an update at the controller 104 of the external information. For example, external information can be updated at the controller 104 in response to a change in a multi-hop topology represented by the external information. One or more portions of the updated external information can be sent to one or more of the edge devices 180 and/or one or more of the peripheral processing devices 170. In some embodiments, the external information can be updated by a network administrator and/or can be triggered in response to movement of one or more of the peripheral processing devices 170 to a different portion of the data center 190. In some embodiments, updates to the external information can trigger updates to internal information. In some embodiments, the updates to the internal information, such as routing tables, can be automatically performed by the controller 104 and/or edge devices 180.

In some embodiments, internal information mapped to the external information can be updated in response to a change to the external information (e.g., external route information). One or more portions of the updated internal information can be sent to one or more of the edge devices 180 and/or one or more of the peripheral processing devices 170.

In some embodiments, external information and/or internal information can be updated in response to a change at or associated with one or more of the peripheral processing devices 170. For example, P3, which was previously included within a particular portion of a multi-hop network topology, may be moved to another place within the multi-hop network topology. Accordingly, the P3 can be configured to send an indicator of the change to the edge device 187 and/or to the controller 104 via the edge device 187. In response to the change, internal information and/or external information stored at the edge device 187 and/or the controller 104 can be updated. The updated internal information and/or updated external information can then be distributed to other portions of the data center 190.

In some embodiments, the controller 104 can be configured to function as a centralized controller for the edge devices 180. For example, when incoming data is received at edge device 187 from P2, the edge device 187 can be configured to query controller 104 regarding how the incoming data should be processed within the switch core 100 based on the incoming data. The controller 104 can send one or more instructions to the edge device 187 to trigger processing of the incoming data at the edge device 187. The processing of the incoming data can be based on one or more relationships (e.g., a mapping) between the external information and/or the internal information. Similarly, when outgoing data is to be sent from one or more of the edge devices 180, the controller 104 can trigger processing of the outgoing data at the edge device(s) 180. The processing of the outgoing data can be based on one or more relationships (e.g., a mapping) between the external information and/or the internal information.

In some embodiments, the controller 104 can be a computing device such as a server. In some embodiments, the controller 104 can be a virtual resource such as a virtual machine stored at a server or compute node. In some embodiments, the controller 104 can be referred to as a data center management (DCM) module.

Although not shown, in some embodiments, the controller 104 can define part of a distributed control system. In some embodiments, the functionality of the controller 104 can be distributed to one or more devices that collectively define at least a portion of a distributed control system. In such embodiments, the switch fabric 102 and edge devices 180 can collectively be referred to as a data plane or as a data plane fabric, and the distributed control system can be referred to as a control plane or as a distributed control plane. The distributed control system can include various network elements such as routing engines (REs). The distributed control system can be a network of elements configured to manage (e.g., process, distribute, define) various types of control plane information used by the switch fabric 102 and edge devices 180 so that the data plane can operate in a desirable fashion as a single logical switch.

In some embodiments, the control plane information can include information used to manage the switch fabric 102 and/or edge devices 180 and/or information used to manage the distributed control system. In some embodiments, the control plane information can include, for example, provisioning information, information defining a virtual multi-hop network topology, virtual local area network (VLAN) information, virtual switch fabric information, network segment information, routes, forwarding states, configuration information, and/or so forth. In some embodiments, the control plane information can be defined by and/or can include information associated with (e.g., received from) the switch fabric 102, the edge devices 185, and/or defined by, for example, a network administrator. The distributed control system (e.g., network elements of the distributed control system) and remaining portions of the switch fabric 102 (and/or edge devices 180) can be configured to exchange various signals related to the exchange of control plane information and that can be used to emulate one or more portions of one or more virtual multi-hop topologies.

Although not shown, in some embodiments, the peripheral processing devices 170 can be associated with one or more VLANs. The VLANs can be associated with one or more virtual multi-hop network topologies. For example, P1 through P4 can be associated with a first VLAN and can be associated with a first virtual multi-hop network topology, and P5 through P9 can be associated with a second VLAN and can be associated with a second virtual multi-hop network topology. Accordingly, the switch core 100 can be configured to emulate one or more portions of the multi-hop network topologies as well as manage traffic associated with the VLANs. In some embodiments, incoming data and/or outgoing data can include one or more identifiers of the VLANs (e.g., VLAN identifiers).

In some embodiments, the virtual multi-hop network topologies emulated by the single-hop switch core 100 can include, for example, a storage area network (SAN), a server network, and/or so forth. In some embodiments, the multi-hop network topologies can be based on one or more protocols such as a fiber channel (e.g., a fiber channel over Ethernet) protocol.

In some embodiments, the peripheral processing devices 170 can be compute nodes, service nodes, routers, and/or storage nodes. In some embodiments, one or more of the compute nodes, the service nodes, the routers, and/or storage nodes can have or can be based on a virtualized resource(s) (e.g., a virtual machine(s)).

One or more of the compute nodes can be a general-purpose computational engine that can include, for example, processors, memory, and/or one or more network interface devices (e.g., a network interface card (NIC)). In some embodiments, the compute nodes can be host devices, servers, and/or so forth.

One or more of the storage nodes can be devices that include, for example, processors, memory, locally-attached disk storage, and/or one or more network interface devices. In some embodiments, the storage nodes can have specialized modules (e.g., hardware modules and/or software modules) configured to enable, for example, one or more of the compute nodes to read data from and/or write data to one or more of the storage nodes via the switch core 100.

One or more of the service nodes can be an open systems interconnection (OSI) layer-4 through layer-7 device that can include, for example, processors (e.g., network processors), memory, and/or one or more network interface devices (e.g., 10 Gb Ethernet devices). In some embodiments, the service nodes can include hardware and/or software configured to perform computations on relatively heavy network workloads. In some embodiments, the service nodes can be configured perform computations on a per packet basis in a relatively efficient fashion (e.g., more efficiently than can be performed at, for example, a compute node). The computations can include, for example, stateful firewall computations, intrusion detection and prevention (IDP) computations, extensible markup language (XML) acceleration computations, transmission control protocol (TCP) termination computations, and/or application-level load-balancing computations.

One or more of the routers can be networking devices configured to connect at least a portion of the switch core 100 to another network (e.g., the global Internet). Although not shown, in some embodiments, one or more of the routers can enable communication between components (e.g., peripheral processing devices 170) within the switch core 100. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, the switch core 100 and/or other peripheral processing devices 170.

In some embodiments, the edge devices 180 can be configured to function as gateway devices between the switch fabric 102 and their respective peripheral processing devices 170. For example, edge device 184 can function as a gateway device between P1, which can be configured to operate based on one protocol, and the switch fabric 102, which can be configured to operate based on a different protocol. In some embodiments, edge device 184 can be configured to function as a gateway device between P1, which can be configured to communicate based on an Ethernet protocol, and the switch fabric 102, which can be a cell-based fabric where one or more portions of data (e.g., portions of data packets) are transmitted via the switch fabric 102 in one or more cells (e.g., variable size cells, fixed size cells). In other words, edge devices 180 can be configured to provide one or more devices configured to communicate via one protocol with access to the switch fabric 102, which can be configured to communicate via another protocol. In some embodiments, edge devices 180 can be referred to as network devices. In some embodiments, the edge devices 180 can be included in a top-of-rack (TOR) of a chassis of the switch core 100.

Although not shown, in some embodiments, the switch fabric 102 can be a multi-stage switch fabric (e.g., 3-stage switch fabric, 5-stage switch fabric). Although not shown, the switch fabric 102 can include an ingress stage, a middle stage, and an egress stage. In some embodiments, the switch fabric can be a reconfigurably (e.g., a re-arrangeably) non-blocking switch fabric and/or a time-division multiplexed switch fabric. In some embodiments, the switch fabric 102 can be referred to as a core portion of the switch core 100. In some embodiments, the switch fabric 102 can be defined based on a Clos network architecture (e.g., a strict sense non-blocking Clos network, a Benes network) that forms the data plane for a distributed switch/router system that can be included in (or can define) the core of the switch core 100. In some embodiments, the switch fabric 102 can be a lossless or substantially lossless switch fabric (e.g., not based on lossy best-effort transmission protocol). More details related to a switch fabric are set forth in co-pending U.S. patent application Ser. No. 12/414,825, filed Mar. 31, 2009, entitled, "Distributed Multi-Stage Switch Fabric," co-pending U.S. patent application Ser. No. 12/345,502, filed Dec. 29, 2008, entitled, "Methods and Apparatus Related to a Modular Switch Architecture," and co-pending U.S. patent application Ser. No. 12/345,500, filed Dec. 29, 2008, entitled, "System Architecture for a Scalable and Distributed Multi-Stage Switch Fabric," all of which are incorporated herein by reference in their entireties.

In some embodiments, one or more components (e.g., controller 104, stages of the switch fabric 102) of the data center 100 can be a hardware-based component (e.g., a digital signal processor (DSP), a field programmable gate array (FPGA)) and/or a software-based component (e.g., a module of computer code, a set of computer-readable instructions that can be executed at a computer). In some embodiments, one or more of the functions associated with the data center 190 can be included in different components and/or combined into one or more components. For example, the controller 104 can be a combination of hardware modules and software modules configured to manage the resources (e.g., resources of the switch core 100) within the data center 190.

Figure 2A:
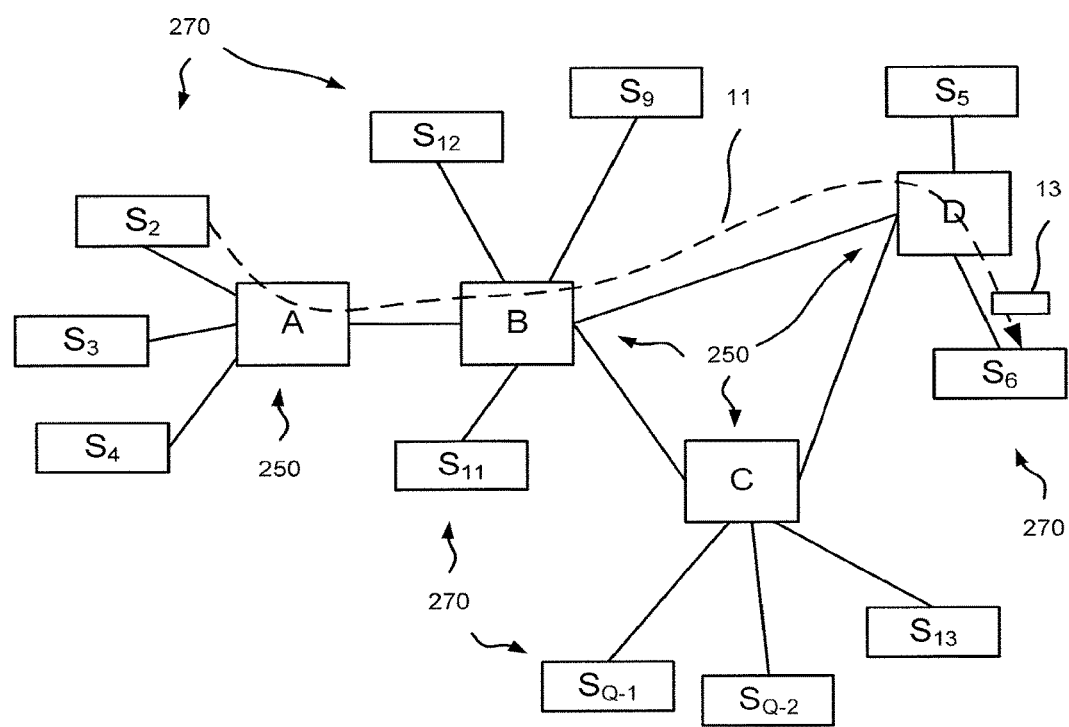
FIG. 2A is a schematic diagram that illustrates a multi-hop network topology, according to an embodiment.
Figure 2B:
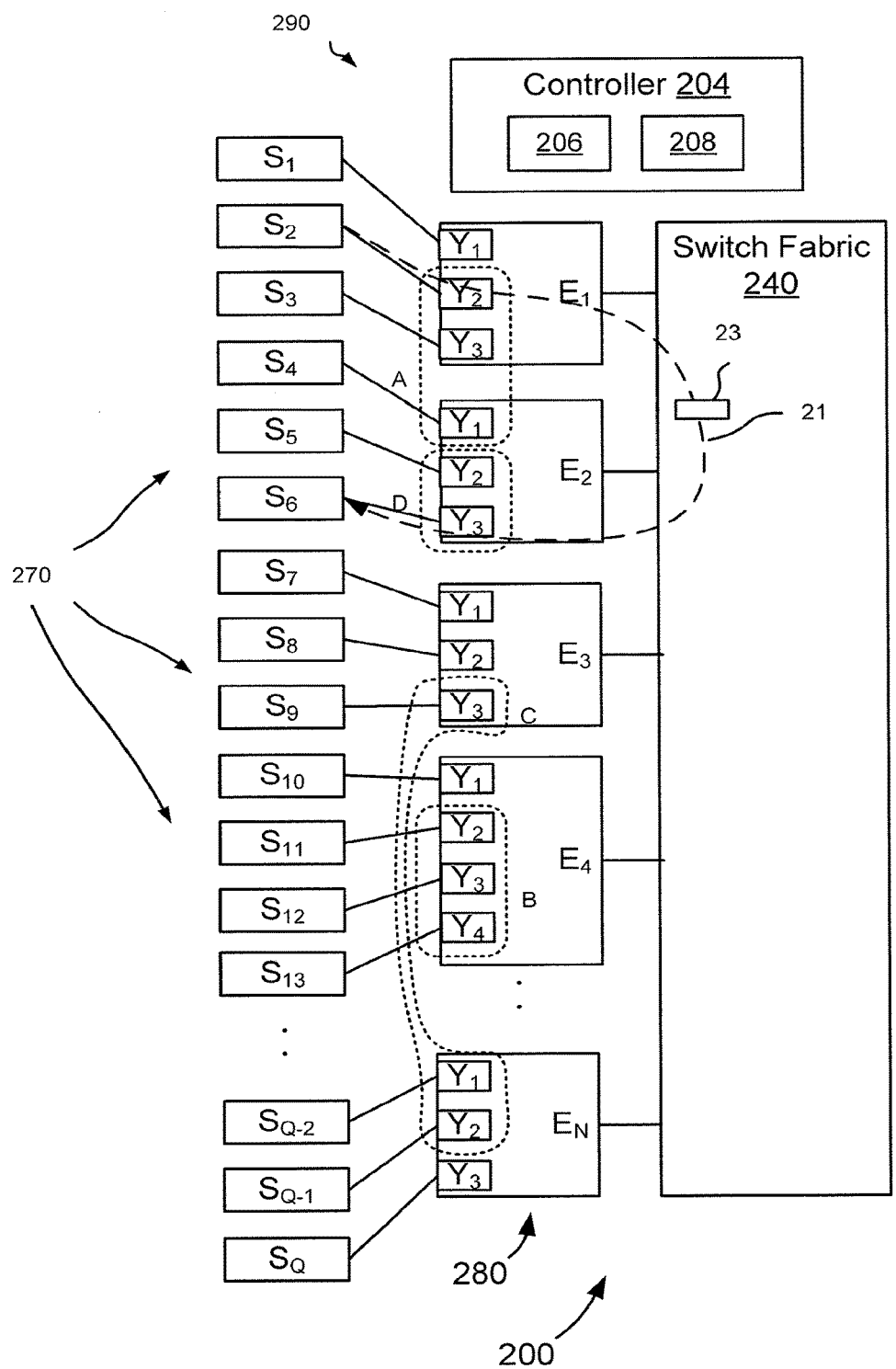
FIG. 2B is a schematic diagram that illustrates a switch core of a data center configured to emulate portions of the multi-hop network topology shown in FIG. 2A, according to an embodiment.

FIG. 2A is a schematic diagram that illustrates a multi-hop network topology including routers 250 and servers 270, according to an embodiment. FIG. 2B is a schematic diagram that illustrates a switch core 200 of a data center 290 configured to emulate portions of the multi-hop network topology shown in FIG. 2B, according to an embodiment. In some embodiments, the multi-hop network topology can be associated with a legacy network system that is migrated to the switch core 200 shown in FIG. 2B. The switch core 200 can be configured to send (e.g., advertise) routing information to the servers 270 so that the servers 270 can function as if connected in the multi-hop network topology via the routers 250 even though the servers 270 are actually connected via the switch core 200.

As shown in FIG. 2A, servers $S_2$-$S_6$, $S_9$, $S_{11}$-$S_{13}$, $S_{Q-2}$, and $S_{Q-1}$ are connected with routers A through D in a multi-hop network topology. The servers can be collectively referred to as servers 270. Although not shown in FIG. 2A, each of the servers 270 is physically connected to at least one of the routers 250 via a port. For example, server $S_2$ is connected with (e.g., operably coupled to) router A via a port of router A, and server $S_{12}$ is connected with (e.g., operably coupled to) router B via a port of router B. In some embodiments, the servers can be devices associated with a storage area network (e.g., storage devices).

A multi-hop path 11 (i.e., a path including multiple single physical hops) of a packet 13 sent from server $S_2$ to server $S_6$ is shown as an example in FIG. 2A. From the perspective of a multi-hop network topology, the packet 13 is transmitted from server $S_2$ to router A via a first physical hop of the multi-hop path 11. The packet 13 is transmitted from router A to router B via a second physical hop, and from router B to router D via a third physical hop. The packet 13 is finally transmitted from router D to its destination, server $S_6$, via a fourth physical hop. The destination can be represented as a destination address value within, for example, a header portion of packet 13. The header portion of the packet 13 can include other information such as a source address value, a packet type value, a protocol type value, and/or so forth.

As shown in FIG. 2B, the multi-hop topology shown in FIG. 2A is virtually represented within the switch core 200. The switch core 200 includes edge devices $E_1$ through $E_N$ (collectively referred to as edge devices 280), which are connected to switch fabric 240. In some embodiments, the switch fabric 240 can be a core portion of the single-hop switch core 200. The edge devices 280 can be configured to serve as a gateways into the switch fabric 240. In some embodiments, the edge devices 280 and the switch fabric 240 can function as a single consolidated logical switch. The switch core 200 also includes controller 204, which includes a memory 206 and a processor 208, and is operatively connected to switch fabric 240 and edge device 280.

As shown in FIG. 2B, the ports from the routers 250 shown in FIG. 2A are virtually (e.g., logically) represented within the switch core 200. For example, ports $Y_2$ and $Y_3$ of edge device $E_1$ and port $Y_1$ of edge device $E_2$ are virtually represented within the data center 290 as router A (shown in FIG. 2A). Similarly, ports $Y_2$ and $Y_3$ of edge device $E_2$ are virtually represented within the data center 290 as router D (shown in FIG. 2A), and ports $Y_2$ through $Y_4$ of edge device $E_4$ are virtually represented within the data center 290 as router B (shown in FIG. 2A). Also, port $Y_3$ of edge device $E_3$ and ports $Y_1$ and $Y_2$ of edge device $E_N$ are virtually represented within the data center 290 as router C (shown in FIG. 2A). In some embodiments, the sets of virtual ports can be referred to as virtual line cards or as virtual routers.

Each of the edge devices 280 are configured to send external routing information (e.g., multi-hop paths, multi-hop routing topology information) to the servers 270 so that the servers 270 will function as if connected in the multi-hop network topology shown in FIG. 2A. For example, edge device $E_2$ can be configured to send external routing information representing that port $Y_3$ of edge device $E_2$ is a port of router D connected to server $S_6$. Accordingly, server $S_6$ will send data packets to port $Y_3$ of edge device $E_2$ as if port $Y_3$ of edge device $E_2$ were a port from router D.

As discussed in connection with FIG. 2A, when packet 13 is sent from server $S_2$ to server $S_6$, packet 13 traverses three routers—routers A, B, and D. As shown in FIG. 2B, a packet 23 sent from server $S_2$ to server $S_6$, when connected via the switch core 200 (shown as path 21), would instead only traverse edge devices $E_1$ and $E_2$, and the switch fabric 240. Specifically, the actual internal routing occurring within the switch core 200 (as represented by internal information) is different than the external routing information advertised to the servers 270. In this embodiment, the portion of the path 21 from edge device $E_1$ and edge device $E_2$ via the switch fabric 240 is a single logical hop. Because the routers 250 shown in FIG. 2A are virtually represented within the switch core 200 shown in FIG. 2B, the packet 23 sent from server $S_2$ to server $S_6$ (when connected via the switch core 200) need not physically traverse router B shown in FIG. 2A.

The server $S_2$, when sending the packet 23, can be configured to send the packet 23 to the switch core 200 based on a multi-hop topology that includes router B. The edge device $E_1$, however, when it receives the packet 23, can be configured to send the packet 23 directly to edge device $E_2$, which is connected to the final destination of server $S_6$. Even though the router B is represented by edge device $E_4$, the edge device $E_1$ can be configured to bypass edge device $E_4$ because the traversal of edge device $E_4$ (which represents router B) is not necessary to route packet 23 to the final destination of $S_6$. In other words, the forwarding of packets between server $S_2$ to server $S_6$, when compared with forwarding within the multi-hop network topology shown in FIG. 2A, is collapsed when implemented within the switch core 200 shown in FIG. 2B.

The bypassing of certain virtually represented routers (or other devices or components) can be accomplished based on internal routing information (e.g., routing tables) different from external routing information (e.g., routing tables) advertised (e.g., sent, broadcast) to the servers 270. Specifically, the external routing information advertised can include information about the multi-hop network topology (such as that shown in FIG. 2A), while the internal routing information can include information that can be used to more directly route data (via the switch core 200) such as packets. In some embodiments, the edge devices 280 can translate between the external routing information and the internal routing information so that incoming data can be routed within the switch core 200 in a desirable fashion. Accordingly, the edge devices 280 can process incoming data received from the servers 270 based on the multi-hop network topology, and can route (e.g., forward) packets within the switch core 200, which has a single-hop switch fabric 240. After the data is processed within the switch core 200, the edge devices 280 can translate between the internal routing information and the external routing information so that incoming data can be sent from the switch core 200 as outgoing data in a desirable fashion.

In some embodiments, the external and/or internal routing information can be limited to portions sent from the controller 204. For example, the controller 204 can be configured to send only a subset of the external information (which represents a multi-hop topology) and/or internal information (which represents the topology of the switch core 200) to one or more of the edge devices 280. Specifically, only the portion of the external information (e.g., port information, next hop information) related to router A can be sent to edge device $E_1$.

In some embodiments, the internal information (e.g., internal routing table) used by the switch core 200 may not include the shortest path between edge devices 280. In some embodiments, the internal information can be configured to trigger routing of data through multiple edge devices so that the data can be processed at the multiple edge devices. For example, a packet, which has a final destination of server $S_9$, can be received from server $S_3$ via port $Y_3$ at edge device $E_1$. Before sending the packet to edge device $E_3$ so that the packet can be sent to server $S_9$ via port $Y_3$ of edge device $E_3$, the edge device $E_1$ can be configured to send (based on internal information) the packet to edge device $E_N$ for processing. The packet can be sent to edge device $E_N$ for processing at, for example, server $S_O$. After processing at server $S_O$ the packet can be sent to edge device $E_3$, which sends the packet to server $S_9$.

Figure 3:
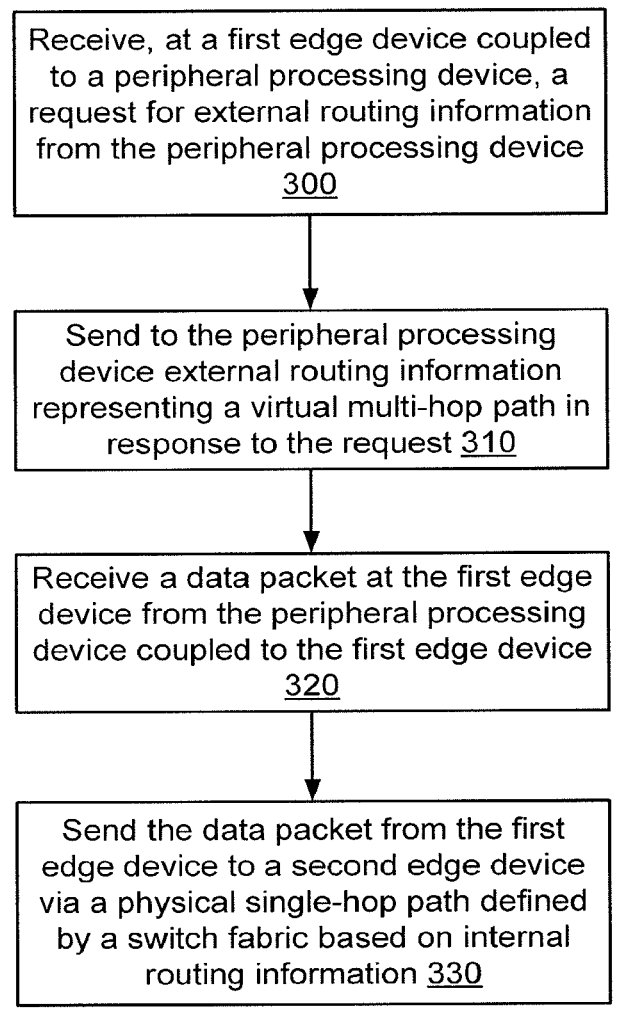
FIG. 3 is a schematic diagram that illustrates a method for handling routing information associated with a virtual multi-hop network topology emulated within a data center, according to an embodiment.

FIG. 3 is a schematic diagram that illustrates a method for handling routing information associated with a virtual multi-hop network topology emulated within a data center, according to an embodiment. As shown in FIG. 3, a request for routing information from a peripheral processing device is received at a first edge device coupled to the peripheral processing device, at 300. The request can be a generic request for routing information from the peripheral processing device. The peripheral processing device and the first edge device can be included, for example, in a data center. In some embodiments, the peripheral processing device can be, for example, a storage device associated with a storage area network or a server.

External routing information representing a virtual multi-hop path is sent to the peripheral processing device in response to the request, at 310. In some embodiments, the virtual multi-hop path can be associated with a virtual multi-hop topology including the peripheral processing device. In some embodiments, the external routing information can be a subset of external routing information stored at, for example, a controller of a data center.

A data packet is received at the first edge device from the peripheral processing device coupled to the first edge device, at 320. The data packet can be defined at the peripheral processing device based on the external routing information received from the edge device.

The data packet is sent from the first edge device to a second edge device via a physical single-hop path defined by a switch fabric based on internal routing information, at 330. In some embodiments, the internal routing information used to route the data packet from the first edge device to the second edge device can be based on a relationship (e.g., a mapping) of at least a portion of the external routing information to the internal routing information.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to encrypted code and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described. For example, several multi-hop network topologies associated with different types of networks, such as a server network and a SAN network, can be emulated within a single data center network.

What is claimed is:

1. An apparatus, comprising:
a switch fabric;
a controller operatively coupled to the switch fabric; and
a plurality of edge devices operatively coupled to an edge of the switch fabric such that each edge device from the plurality of edge devices is a single logical hop from the remaining edge devices from the plurality of edge devices via the switch fabric, the controller configured to emulate a virtual multi-hop network topology within the switch fabric and the plurality of edge devices,
the plurality of edge devices and the switch fabric collectively define at least a portion of a switch core defining a single logical entity,
the controller is configured to store a first routing information representing a single-hop topology of the plurality of edge devices, the controller is configured to store a second routing information representing the virtual multi-hop network topology,
the second routing information is associated with routing data executed outside of the switch core, the first routing information is associated with routing of the data executed within the switch core.

2. The apparatus of claim 1, wherein the virtual multi-hop network topology is a representation of a storage area network (SAN) topology.

3. The apparatus of claim 1, wherein the controller is configured to access a representation of a mapping of each node from a plurality of nodes within the virtual multi-hop network topology to at least one edge device from the plurality of edge devices at the edge of the switch fabric.

4. The apparatus of claim 1, wherein the controller is configured to access a representation of a mapping of a port from each virtual switch from the virtual multi-hop network topology to a port from an edge device from the plurality of edge devices.

5. The apparatus of claim 1, wherein the plurality of edge devices and the switch fabric collectively define at least the portion of the switch core such that routing via a multi-hop path within the virtual multi-hop network topology is executed within the switch core via a single-hop path between two of the edge devices from the plurality of edge devices.

6. The apparatus of claim 1, wherein the controller is configured to send routing information representing at least a portion of the virtual multi-hop network topology to a peripheral processing device operatively coupled to at least one edge device from the plurality of edge devices.

7. An apparatus, comprising:
a switch fabric;
a controller operatively coupled to the switch fabric; and
a plurality of edge devices operatively coupled to an edge of the switch fabric such that each edge device from the plurality of edge devices is a single logical hop from the remaining edge devices from the plurality of edge devices via the switch fabric, the controller configured to emulate a virtual multi-hop network topology within the switch fabric and the plurality of edge devices, the controller is configured to send to a peripheral processing device routing information representing a multi-hop path between a virtual source device and a virtual destination device, the controller is configured to access a representation of a mapping of the virtual source device to a first edge device from the plurality of edge devices, the controller is configured to access a representation of a mapping of the virtual destination device to a second edge device from the plurality of edge devices, the first edge device and the second edge device being separated by only a single logical hop via the switch fabric.

8. The apparatus of claim 1, wherein the controller is configured to send routing information representing a portion of the virtual multi-hop network to a plurality of peripheral processing devices operatively coupled to the plurality of edge devices in response to the portion of the virtual multi-hop network topology being updated.

9. An apparatus, comprising:
a controller configured to be operatively coupled to a switch fabric and a plurality of edge devices that are operatively coupled to an edge of the switch fabric such that each edge device from the plurality of edge devices is a single logical hop from the remaining edge devices from the plurality of edge devices via the switch fabric,
the controller configured to emulate a virtual multi-hop network topology within the switch fabric and the plurality of edge devices, the virtual multi-hop network topology representing a virtual network topology for a legacy physical multi-hop network,
the controller is configured to use internal routing information to process a data packet from an edge device from the plurality of edge devices,
the controller is configured to send external routing information to a plurality of physical legacy network devices in the legacy physical multi-hop network, and
the controller is configured to translate the internal routing information into external routing information when communicating with the plurality of physical legacy network devices in the legacy physical multi-hop network.

10. The apparatus of claim 9, wherein the controller is configured to access a representation of a mapping of each node from a plurality of nodes within the virtual multi-hop network topology to at least one edge device from the plurality of edge devices.

11. The apparatus of claim 9, wherein the controller is configured to access a representation of a mapping of a port from each virtual switch from the virtual multi-hop network topology to a port from an edge device from the plurality of edge devices.

12. The apparatus of claim 9, wherein the controller is configured to send routing information representing at least a portion of the virtual multi-hop network topology to a peripheral processing device operatively coupled to at least one edge device from the plurality of edge devices.

13. The apparatus of claim 9, wherein the controller is configured to send routing information representing a portion of the virtual multi-hop network to a plurality of peripheral processing devices operatively coupled to the plurality of edge devices in response to the portion of the virtual multi-hop network topology being updated.

* * * * *